(12) United States Patent
Osborn et al.

(10) Patent No.: US 10,899,352 B2
(45) Date of Patent: Jan. 26, 2021

(54) VEHICLE APPARATUS AND METHOD

(71) Applicant: JAGUAR LAND ROVER LIMITED, Warwickshire (GB)

(72) Inventors: Russell Osborn, Coventry (GB); Thomas Valero, Coventry (GB); Olivier Roques, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 16 days.

(21) Appl. No.: 16/099,724

(22) PCT Filed: May 4, 2017

(86) PCT No.: PCT/EP2017/060640
§ 371 (c)(1),
(2) Date: Nov. 8, 2018

(87) PCT Pub. No.: WO2017/194384
PCT Pub. Date: Nov. 16, 2017

(65) Prior Publication Data
US 2019/0185002 A1     Jun. 20, 2019

(30) Foreign Application Priority Data

May 10, 2016  (GB) .................................. 1608185.3

(51) Int. Cl.
*B60W 10/06*     (2006.01)
*B60W 30/18*     (2012.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS 5,105,901 A * 4/1992 Watanabe .......... B60K 23/0808
                                                        180/245
8,608,611 B2 * 12/2013 Ekonen .................. B60K 17/35
                                                        475/221
(Continued)

FOREIGN PATENT DOCUMENTS

DE   102011005095 A1   9/2012
EP       1859982 A2   11/2007
(Continued)

OTHER PUBLICATIONS

Combined Search and Examination Report under Sections 17 and 18(3) for Application No. GB 1608185.3 dated Oct. 27, 2016.
(Continued)

*Primary Examiner* — Justin Holmes
(74) *Attorney, Agent, or Firm* — Carlson, Gaskey & Olds

(57) ABSTRACT

The present invention relates to a vehicle (1) having a torque generating machine (4); and one or more driven wheel ($W_D$). A driveline (6) is provided for transmitting torque from the torque generating machine (4) to said one or more driven wheel. The driveline (6) includes a torque transmitting means (8). A first decoupling mechanism (11) is operable to decouple the torque transmitting means (8) from the torque generating machine (4). The first decoupling mechanism (11) is closed to couple the torque transmitting means (8) to the torque generating machine (4) and is opened to decouple the torque transmitting means (8) from the torque generating machine (4). A second decoupling mechanism (12) is operable to decouple the torque transmitting means (8) from the one or more driven wheel. The second decoupling mechanism (12) is closed to couple the torque transmitting means
(Continued)

(8) to the one or more driven wheel and is opened to decouple the torque transmitting means (8) from the one or more driven wheel. A controller (2) is provided having at least one electronic processor for controlling operation of the first and second decoupling mechanisms (11, 12). The at least one electronic processor (P) is configured to close the first decoupling mechanism (11), to determine a target operating speed of the torque generating machine (4), to control the operating speed of the torque generating machine (4) in dependence on the determined target operating speed and to close the second decoupling mechanism (12) when the operating speed of the torque generating machine (4) at least substantially matches the determined target operating speed. The present invention also relates to a corresponding method of controlling first and second decoupling mechanisms (11, 12) to control the transmittal of torque from a torque generating machine (4) to one or more driven wheel of a vehicle (1).

15 Claims, 9 Drawing Sheets

(51) Int. Cl.
  *B60W 10/02* (2006.01)
  *F16D 48/00* (2006.01)
  *B60W 50/00* (2006.01)
(52) U.S. Cl.
  CPC ..... *F16D 48/00* (2013.01); *B60W 2030/1809* (2013.01); *B60W 2030/18081* (2013.01); *B60W 2050/0096* (2013.01); *B60W 2510/0208* (2013.01); *B60W 2520/28* (2013.01); *B60W 2710/021* (2013.01); *B60W 2710/0644* (2013.01); *F16D 2500/5085* (2013.01); *Y02T 10/60* (2013.01)

(56) References Cited

U.S. PATENT DOCUMENTS

| 2002/0153770 | A1* | 10/2002 | Matsuno | B60W 30/02 303/146 |
| 2005/0103551 | A1* | 5/2005 | Matsuno | B60K 6/52 180/243 |
| 2009/0277711 | A1 | 11/2009 | Hoffmann et al. | |
| 2010/0094519 | A1* | 4/2010 | Quehenberger | B60K 17/3515 701/69 |
| 2011/0256976 | A1* | 10/2011 | Burgbacher | B60K 17/35 475/198 |
| 2016/0039284 | A1 | 2/2016 | Osborn et al. | |

FOREIGN PATENT DOCUMENTS

| WO | 2010085519 A1 | 7/2010 |
| WO | 2015151320 A1 | 10/2015 |

OTHER PUBLICATIONS

International Search Report and Written Opinion of the International Searching Authority for Application No. PCT/EP2017/060640 dated Jul. 31, 2017.

* cited by examiner

Gliding with Driveline Disconnect

Gliding with Driveline Disconnect

VEHICLE APPARATUS AND METHOD

TECHNICAL FIELD

The present disclosure relates to a vehicle apparatus and a method. More particularly, but not exclusively, the vehicle apparatus is operable selectively to couple and decouple the vehicle driveline; and the method relates to the selective coupling and decoupling of the vehicle driveline.

BACKGROUND

It is known to disconnect a vehicle driveline and to reduce an operating speed of an internal combustion engine to reduce fuel consumption. This strategy is known variously as vehicle gliding, vehicle sailing, idle coasting etc. The operating mode is referred to herein as a gliding mode.

An example of a known driveline disconnect strategy is disclosed in the Applicant's earlier UK patent application GB1316183.1. A rear-wheel drive vehicle 1 having a powertrain 3 is illustrated in FIG. 1. The powertrain 3 comprises an internal combustion engine 4, a transmission 5 and a driveline 6. When a gliding mode is activated, the driveline 6 is decoupled from the internal combustion engine 4. The operating speed of the internal combustion engine 4 can then be reduced, for example to operate at idle, to provide improved fuel efficiency. When the internal combustion engine 4 is decoupled, the driveline 6 is rotated by a torque applied by the driven wheels $W_D$ (the rear wheels in the present arrangement). The dynamic operating states of the respective components when the vehicle 1 is operating in a conventional gliding mode are illustrated in FIG. 1.

A vehicle 1 having a front-wheel drive arrangement is illustrated in FIG. 2. The front-wheel drive vehicle 1 can also operate in a gliding mode by decoupling the driveline 6 from the internal combustion engine 4. When the driveline 6 is decoupled, the driveline 6 is rotated by a torque applied by the driven wheels $W_D$ (the front wheels in the present arrangement). The dynamic operating states of the respective components when the vehicle 1 is operating in a conventional gliding mode are illustrated in FIG. 2.

The relationship between the operating loads on a vehicle 1 travelling down a 2% negative gradient is illustrated in FIG. 3. The loads are expressed as the torque within a powertrain of the vehicle 1. The positive (accelerating) forces acting on the vehicle 1, represented by a first arrow pointing in the direction of travel (from left to right in FIG. 2), comprise: an engine torque A delivered in dependence on a driver torque request; and an effective torque B derived from the road gradient. The sum of the engine torque A and the effective torque B represents a total torque at the wheels of A+B. The negative (decelerating) forces acting on the vehicle 1, represented by a second arrow pointing in the opposite direction (from right to left in FIG. 2), comprise: an aerodynamic torque C; a road loss torque D; an engine loss torque E; a transmission loss torque F; and a driveline loss torque G. The total negative torque is −(C+D+E+F+G); and the total positive torque is (A+B). A first difference between the positive torque and the negative torque is calculated as follows: (A+B)−(C+D+E+F+G). When the gliding mode is activated, the vehicle driveline 6 is disconnected from the internal combustion engine 4 and the total torque comprises a positive torque comprising the effective torque B; and a negative torque comprising the aerodynamic torque C, the road loss torque D, the transmission loss torque F and the driveline loss G. The internal combustion engine 4 is disconnected from the driveline 6 so the engine loss torque E is not applied. A second difference between the positive torque and the negative torque is calculated as follows: (B)−(C+D+F+G). The internal combustion engine can operate at a lower speed, for example idle, or can be switched off.

It would be advantageous to broaden the range of operating conditions in which the driveline could be decoupled from the internal combustion engine. It is against this backdrop that the present invention has been conceived.

SUMMARY OF THE INVENTION

Aspects of the present invention relate to a vehicle operable selectively to couple and decouple a driveline; and to a method of selectively coupling and decoupling a driveline of a vehicle as claimed in the appended claims.

According to a further aspect of the present invention there is provided a vehicle comprising:
 a torque generating machine;
 one or more driven wheel;
 a driveline for transmitting torque from the torque generating machine to said one or more driven wheel, the driveline comprising a torque transmitting means;
 a first decoupling mechanism operable to decouple the torque transmitting means from the internal combustion engine, wherein the first decoupling mechanism is closed to couple the torque transmitting means to the internal combustion engine and is opened to decouple the torque transmitting means from the internal combustion engine;
 a second decoupling mechanism operable to decouple the torque transmitting means from the one or more driven wheel, wherein the second decoupling mechanism is closed to couple the torque transmitting means to the one or more driven wheel and is opened to decouple the torque transmitting means from the one or more driven wheel; and
 a controller comprising at least one electronic processor for controlling operation of the first and second decoupling mechanisms. The arrangement of the first and second decoupling mechanisms allows the torque transmitting means to be decoupled, thereby providing a reduction in driveline losses. This arrangement has particular application when the vehicle is operating in a driveline disconnect gliding mode in which at least a portion of the driveline can be decoupled and an operating speed of the internal combustion engine may be reduced.

The first decoupling mechanism comprises a first torque input means and a first torque output means. The first torque input means is connected to the internal combustion engine. The first torque output means is connected to the torque transmitting means. The first decoupling mechanism is operable selectively to transmit torque from said first torque input means to said first torque output means. The first torque input means may comprise a first input shaft; and the first torque output means may comprise a first output shaft.

At least in certain embodiments, the first decoupling mechanism may accommodate slip to accommodate a speed differential between the first input means and the first output means. The first decoupling mechanism may comprise one or more friction plate. The first decoupling mechanism may comprise a first multi-plate clutch. In alternate arrangements, the first decoupling mechanism may be configured so as not to accommodate slip. The first decoupling mechanism can, for example, comprise one or more of the following set:

a torque converter, a single-plate clutch, a multi-plate clutch, a synchronizer, a hydrostatic coupling and a magnetic coupling.

The second decoupling mechanism comprises a second torque input means and a second torque output means. The second torque input means is connected to the one or more driven wheel. The second torque output means is connected to the torque transmitting means. The second decoupling mechanism is operable selectively to transmit torque from said second torque input means to said second torque output means. The second torque input means may comprise a second input shaft; and the second torque output means may comprise a second output shaft.

At least in certain embodiments, the second decoupling mechanism may accommodate slip to accommodate a speed differential between the second input means and the second output means. The second decoupling mechanism may comprise one or more friction plate.

The second decoupling mechanism may comprise one or more of the following set: a torque converter, a single-plate clutch, a multi-plate clutch, a synchronizer, a hydrostatic coupling and a magnetic coupling. In alternate arrangements, the second decoupling mechanism may be a non-slip mechanism (i.e. a mechanism which does not accommodate slip between the second torque input means and the second torque output means). The second decoupling mechanism can, for example, comprise a dog clutch disposed in series with an output of a differential; or a dog clutch disposed between a ring gear and a differential carrier.

The first and second decoupling mechanisms may be controlled to recouple the torque transmitting means to the internal combustion engine and the one or more driven wheel.

The torque transmitting means is suitable for transmitting torque to propel the vehicle. The torque transmitting means may comprise a drive shaft. Alternatively, or in addition, the torque transmitting means may comprise a differential, a torque transfer transmission, a transfer case or a drive mechanism.

The at least one electronic processor may be configured to close the second decoupling mechanism to couple the torque transmitting means to the one or more driven wheel. The at least one electronic processor may be configured to start the torque generating machine. The at least one electronic processor may be configured to determine a target operating speed of the torque generating machine. The target operating speed may be determined before, during or after the second decoupling mechanism is closed. The at least one electronic processor may control an operating speed of the torque generating machine in dependence on the determined target operating speed. The at least one electronic processor may close the first decoupling mechanism when the operating speed of the torque generating machine at least substantially matches the determined target operating speed.

The target operating speed may be determined at least substantially to synchronize the rotational speeds of the first input shaft and the first output shaft. The rotational speed of the first output shaft is proportional to the rotational speed of the torque transmitting means. The rotational speed of the torque transmitting means may be measured directly, for example by a speed sensor. When the second decoupling mechanism is closed, the rotational speed of the torque transmitting means is proportional to the wheel speed. Thus, after the second decoupling mechanism is closed, the rotational speed of the torque transmitting means may be determined based on the wheel speed of the one or more driven wheel. The target operating speed may be determined in dependence on a wheel speed signal comprising a measured wheel speed of the one or more driven wheel. The first input shaft and the first output shaft may be synchronized by matching the operating speed of the torque generating machine to the determined target operating speed.

The at least one electronic processor may be configured to receive a torque demand signal, for example generated in dependence on a throttle pedal position signal. The target operating speed may be determined in dependence on the torque demand signal. The internal combustion engine may deliver a requested torque when the first decoupling mechanism is closed. In this arrangement, the first decoupling mechanism should provide slip to accommodate any speed differential between the first input shaft and the first output shaft when the first decoupling mechanism is closed.

The at least one electronic processor may be configured to start the torque generating machine when the first torque decoupling mechanism is open. The at least one electronic processor may be configured to determine a target operating speed of the torque generating machine. The target operating speed may be determined at least substantially to synchronize the rotational speeds of the first and second input shafts. The target operating speed may be determined in dependence on a wheel speed signal comprising a measured wheel speed of the one or more driven wheel. The target operating speed may be determined such that the first and second input shafts rotate at substantially the same speed. The at least one electronic processor may control the operating speed of the torque generating machine in dependence on the determined target operating speed. The at last one electronic processor may be configured to close the first decoupling mechanism when the operating speed of the torque generating machine at least substantially matches the determined target operating speed. The second decoupling mechanism may be closed after closing the first decoupling mechanism. Once the first decoupling mechanism is closed, the second input shaft and the second output shaft rotate at substantially the same speed. In this arrangement, the second decoupling mechanism does not have to accommodate slip since the second input shaft and the second output shaft are rotating at substantially the same speed when the second decoupling mechanism is closed.

The at least one electronic processor may be configured to start the torque generating machine when the first torque decoupling mechanism is open. The at least one electronic processor may be configured to close the first decoupling mechanism. The at least one electronic processor may determine a target operating speed of the torque generating machine. After closing the first decoupling mechanism, the at least one electronic processor may control the operating speed of the torque generating machine in dependence on the determined target operating speed. The target operating speed may be determined in dependence on a wheel speed signal comprising a measured wheel speed of the one or more driven wheel. The target operating speed may be determined such that the first and second input shafts rotate at substantially the same speed. The at least one electronic processor may be configured to close the second decoupling mechanism when the operating speed of the torque generating machine at least substantially matches the determined target operating speed. In this arrangement, the second decoupling mechanism does not have to accommodate slip since the second input shaft and the second output shaft are rotating at substantially the same speed when the second decoupling mechanism is closed.

The at least one electronic processor may be configured to determine the target operating speed of the torque generating machine in dependence on the wheel speed signal such that a rotational speed of the torque transmitting means is synchronised with a wheel speed represented by the wheel speed signal.

The vehicle may comprise a transmission coupled to the torque generating machine. The transmission comprises is operable to select one of a plurality of gear ratios. The transmission may be an automatic transmission. The first decoupling mechanism may be incorporated into the transmission. Alternatively, the first decoupling mechanism may be disposed between the internal combustion engine and the transmission; or between the transmission and the torque transmitting means.

The torque generating machine may comprise an internal combustion engine.

The controller may be configured to activate a driveline disconnect gliding mode by opening the first decoupling mechanism to decouple the torque transmitting means from the torque generating machine and opening the second decoupling mechanism to decouple the torque transmitting means from the one or more driven wheel.

According to a further aspect of the present invention there is provided a method of controlling first and second decoupling mechanisms to control the transmittal of torque from a torque generating machine to one or more driven wheel of a vehicle; the method comprising:
  opening the first decoupling mechanism to decouple the torque transmitting means from the internal combustion engine;
  opening the second decoupling mechanism to decouple the torque transmitting means from the one or more driven wheel. The first and second decoupling mechanisms may be opened simultaneously. Alternatively, the first and second decoupling mechanisms may be opened sequentially. The first decoupling mechanism may be opened before the second decoupling mechanism; or the second decoupling mechanism may be opened before the first decoupling mechanism.

The method may comprise:
  closing the second decoupling mechanism to couple the torque transmitting means to the one or more driven wheel;
  determining a target operating speed of the torque generating machine;
  controlling an operating speed of the torque generating machine in dependence on the determined target operating speed; and
  closing the first decoupling mechanism when the operating speed of the torque generating machine at least substantially matches the determined target operating speed.

The target operating speed of the torque generating machine may be determined after closing the second decoupling mechanism. The target operating speed of the torque generating machine may be determined in dependence on a wheel speed signal.

Alternatively, or in addition, the method may comprise determining the target operating speed of the torque generating machine in dependence on a torque demand request made by a driver of the vehicle.

The method may comprise:
  determining a target operating speed of the torque generating machine;
  controlling the operating speed of the torque generating machine in dependence on the determined target operating speed;
  closing the first decoupling mechanism when the operating speed of the torque generating machine at least substantially matches the determined target operating speed; and
  closing the second decoupling mechanism after closing the first decoupling mechanism.

The method may comprise:
  closing the first decoupling mechanism;
  determining a target operating speed of the torque generating machine;
  controlling the operating speed of the torque generating machine in dependence on the determined target operating speed; and
  closing the second decoupling mechanism when the operating speed of the torque generating machine at least substantially matches the determined target operating speed.

The target operating speed of the torque generating machine may be determined in dependence on a wheel speed signal.

The first decoupling mechanism may comprise a first torque input means and a first torque output means. The first decoupling mechanism may comprise a slipping mechanism for accommodating slip between said first torque input means and said first torque output means. For example, the first decoupling mechanism may comprise one or more friction plate for accommodating slip.

The second decoupling mechanism may comprise a second torque input means and a second torque output means. The second decoupling mechanism may comprise a non-slip mechanism which does not accommodate slip between said first torque input means and said first torque output means. The second decoupling mechanism can, for example, comprise a torque converter, a single-plate clutch, a multi-plate clutch, a synchronizer, a hydrostatic coupling or a magnetic coupling.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A vehicle 1 comprising a controller 2 according to an embodiment of the present invention will now be described with reference to FIGS. 4, 5 and 6. The controller 2 is configured selectively to activate and deactivate a driveline disconnect gliding mode. In the present embodiment, the vehicle 1 is a rear-wheel drive automobile having driven wheels $W_D$ disposed at the rear. It will be appreciated that the invention described herein is not limited to this drive configuration. Moreover, the invention can be implemented in different types of vehicle.

Figure 1:
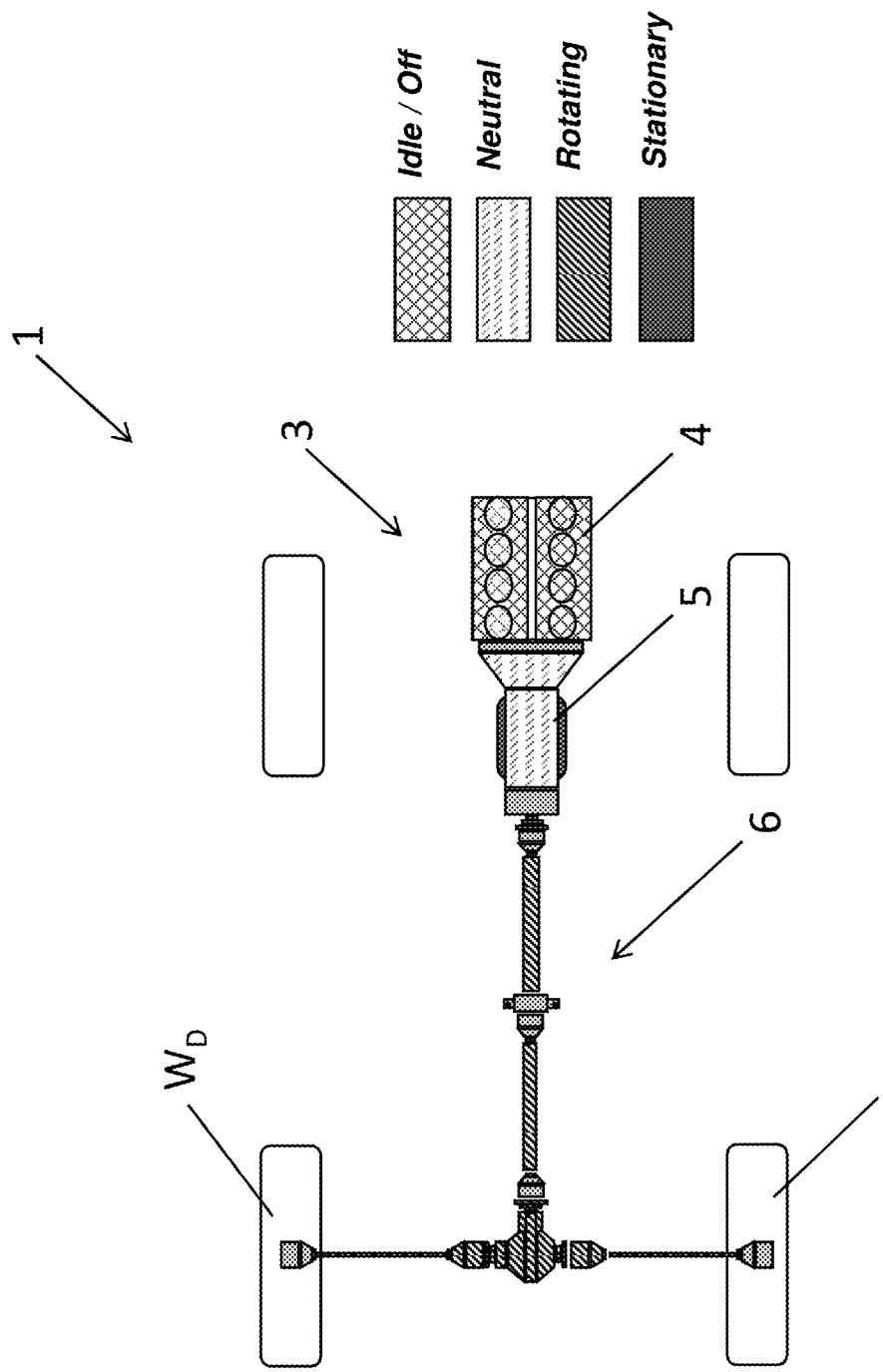
FIG. 1 shows a schematic representation of the main components of a conventional rear-wheel drive vehicle.
Figure 2:
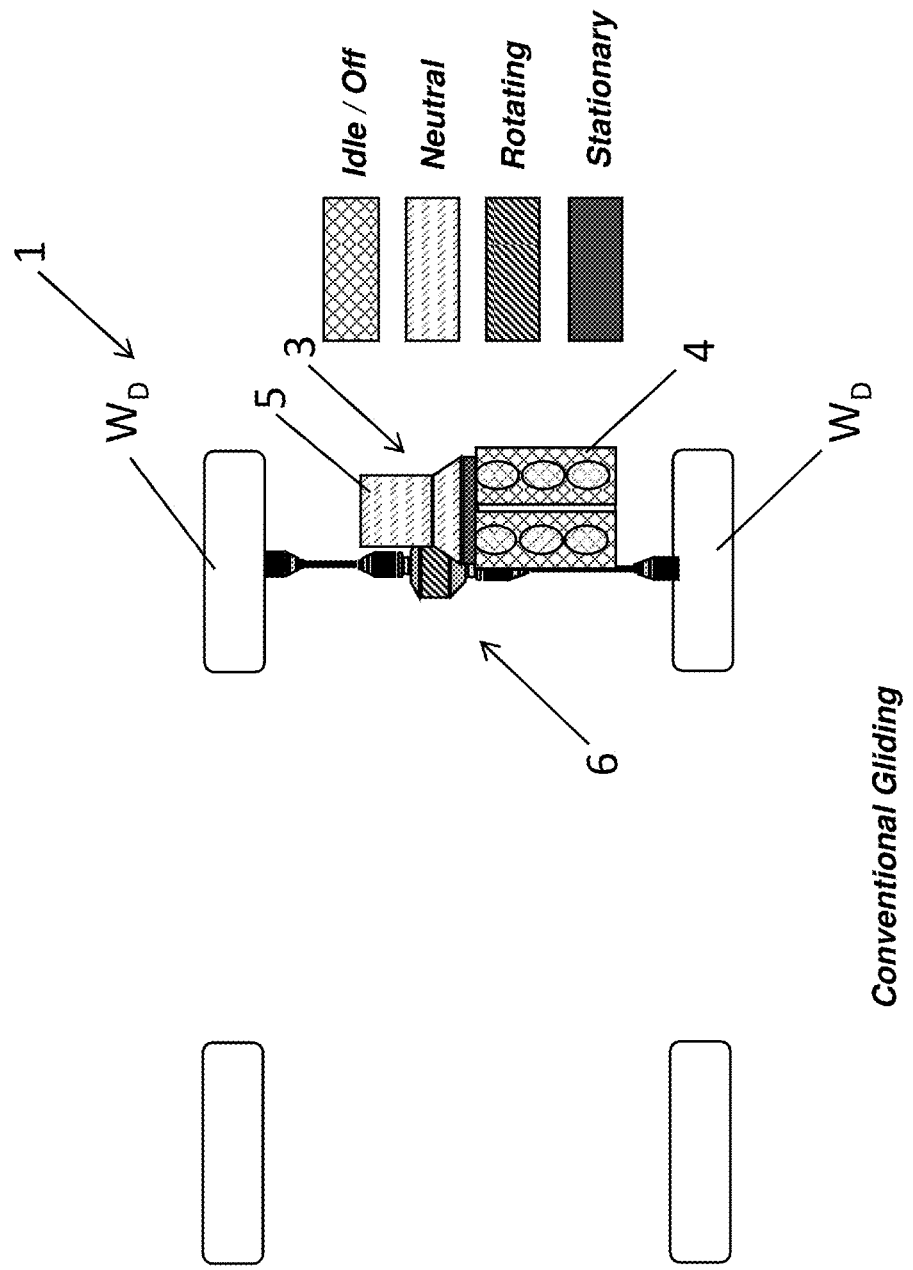
FIG. 2 shows a schematic representation of the main components of a conventional front-wheel drive vehicle.
Figure 3:
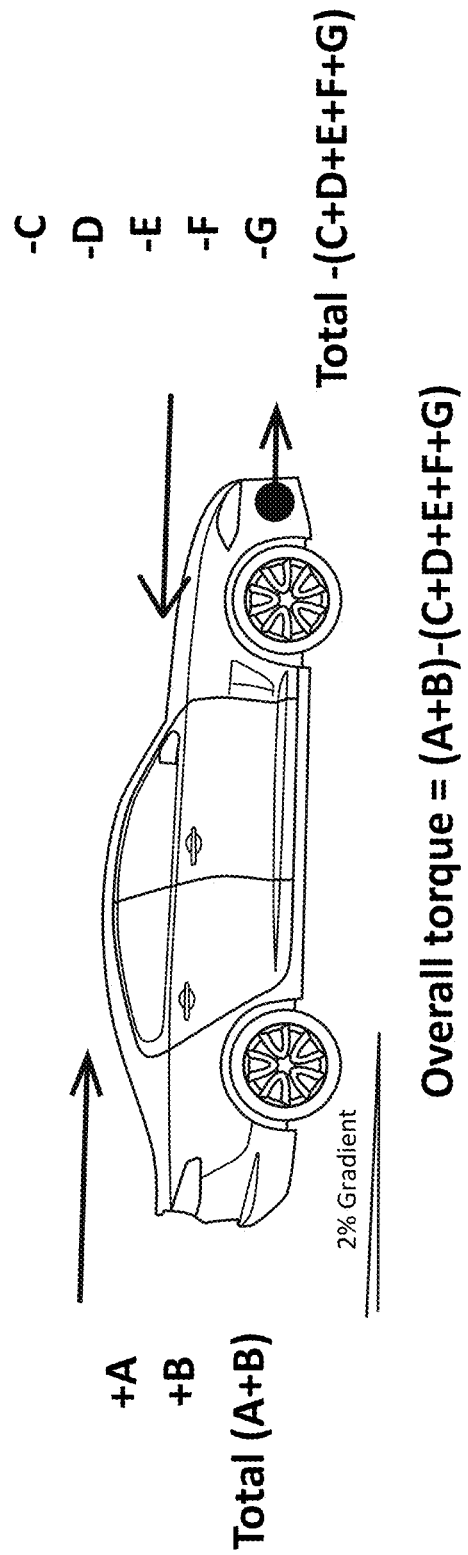
FIG. 3 shows a schematic representation of the forces acting on a vehicle when operating in a gliding mode.
Figure 4:
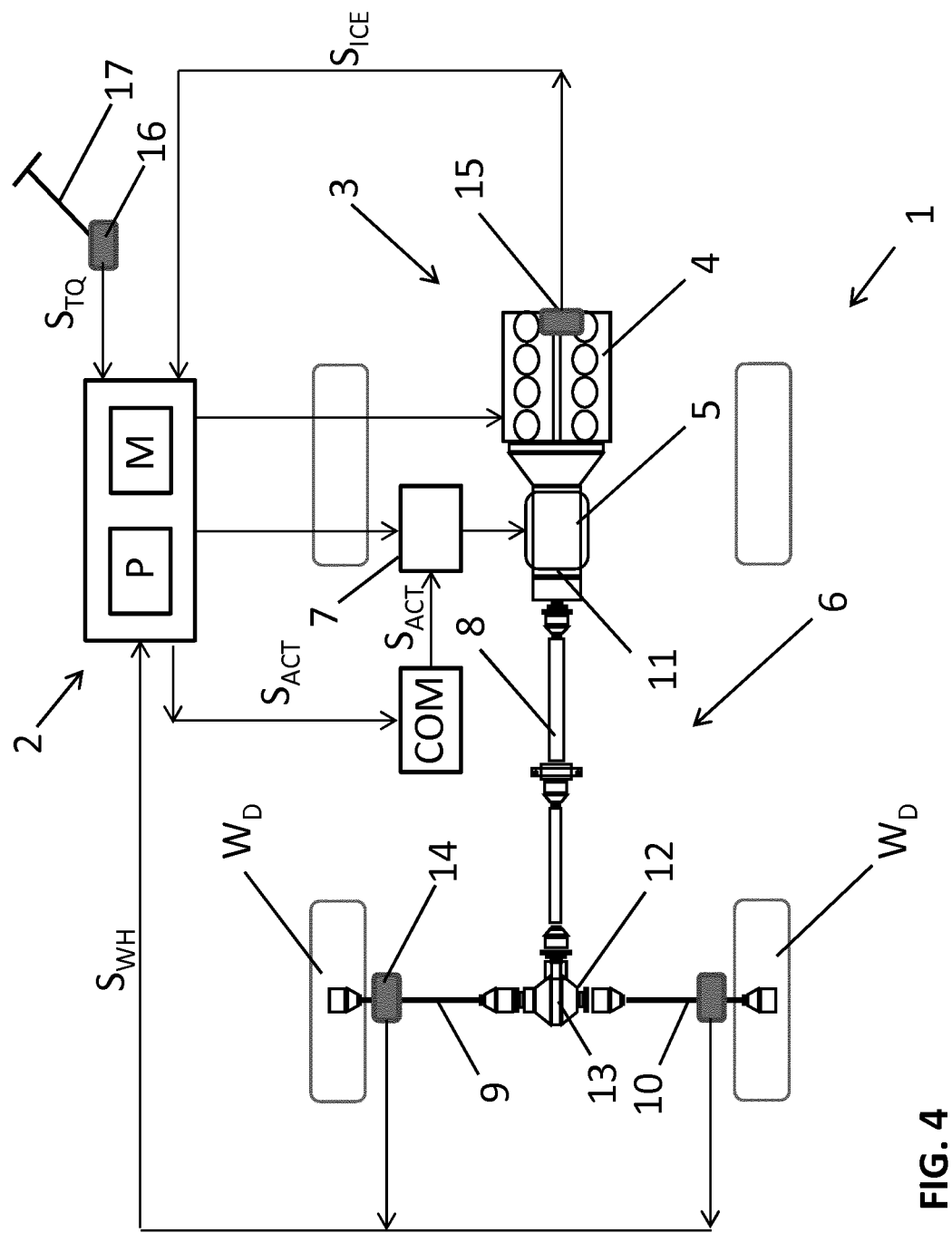
FIG. 4 shows a schematic representation of a vehicle configured to operate in a driveline disconnect gliding mode in accordance with an embodiment of the present invention.
Figure 5:
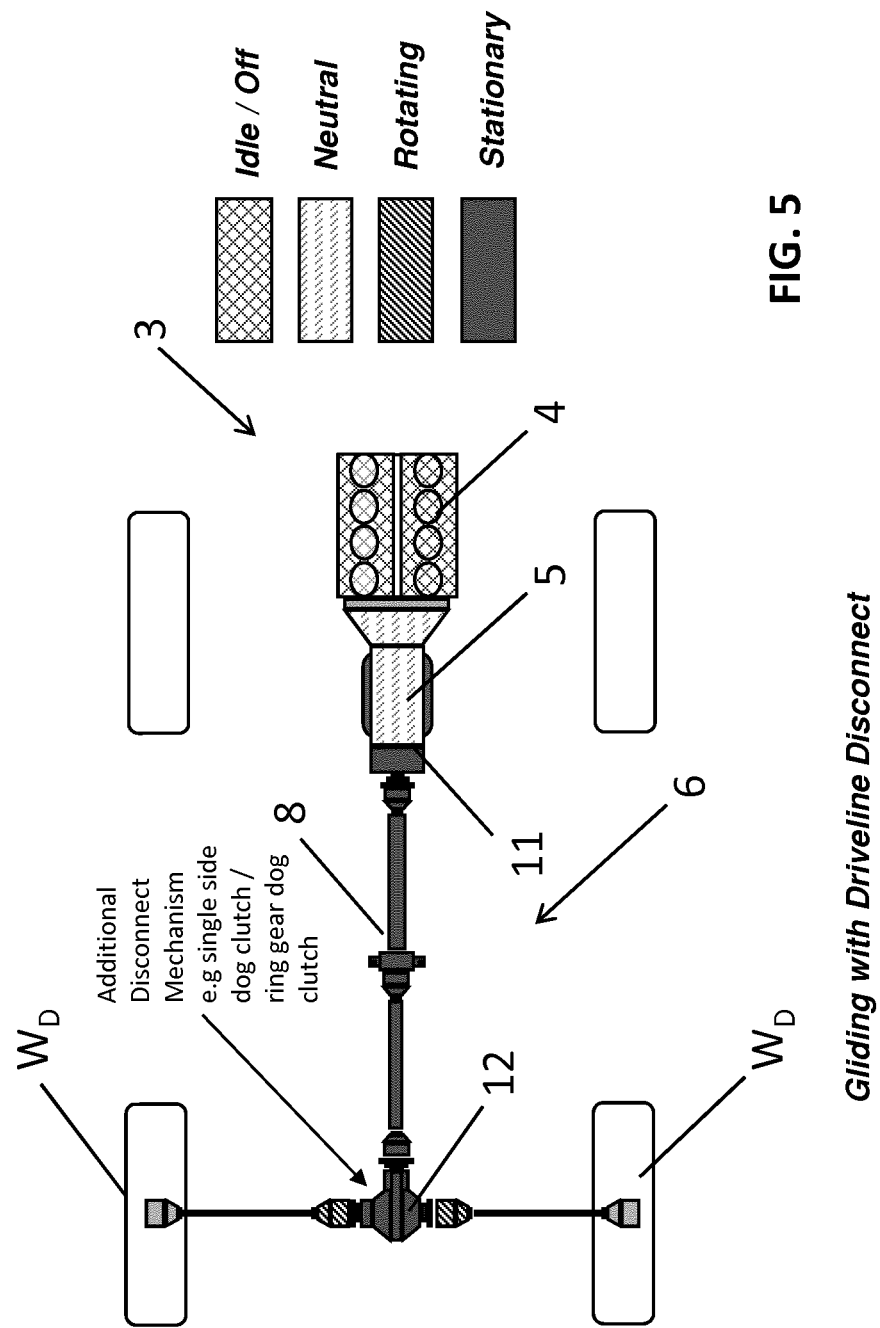
FIG. 5 shows a schematic representation of the dynamic operating states of the components in the driveline of the vehicle shown in FIG. 4 when operating in said driveline disconnect gliding mode.

As illustrated in FIG. 4, the vehicle 1 comprises a powertrain 3 for generating a traction force to propel the vehicle 1. The powertrain 3 comprises an internal combustion engine 4, a transmission 5 and a driveline 6. The internal combustion engine 4 is arranged in a longitudinal configuration (North South) in the vehicle 1. The transmission 5 is an automated transmission comprising one or more internal friction brake; and one or more multi-plate clutch. The transmission 5 is controlled by a transmission control module (TCM) 7. The driveline 6 is arranged to transmit torque from the internal combustion engine 4 to driven wheels $W_D$. In the present embodiment, the driveline 6 is configured to transmit torque to the rear wheels of the vehicle 1. The powertrain 3 could optionally also include an electric traction machine (not shown) for supplying a traction force to said driven wheels $W_D$.

The driveline 6 comprises a torque transmitting means for transmitting torque from the internal combustion engine 4 to the driven wheels $W_D$. In the present embodiment, the torque transmitting means is in the form of a drive shaft 8. The drive shaft 8 is selectively coupled to the driven wheels $W_D$ by first and second rear half shafts 9, 10. The vehicle 1 comprises a first decoupling mechanism 11 and a second decoupling mechanism 12. The first and second decoupling mechanisms 11, 12 are disposed at opposite ends of the drive shaft 8 and, as described herein, can be controlled independently of each other. As described herein, the controller 2 is configured to control operation of the first and second decoupling mechanisms 11, 12.

The first decoupling mechanism 11 comprises a first input means in the form of a first input shaft; and a first output means in the form of a first output shaft. The internal combustion engine 4 transmits an input torque to the first input shaft; and the first output shaft transmits an output torque to the drive shaft 8. The first decoupling mechanism 11 is operable selectively to couple and decouple the drive shaft 8 from the internal combustion engine 4. The first decoupling mechanism 11 is opened to decouple the first input shaft from the first output shaft, thereby decoupling the drive shaft 8 from the internal combustion engine 4. Conversely, the first decoupling mechanism 11 is closed to couple the first input shaft to the first output shaft, thereby coupling the drive shaft 8 to the internal combustion engine 4. The first decoupling mechanism 11 is implemented by controlling operation of the transmission 5, for example by opening a clutch in the transmission 5 to disconnect the drive shaft 8 from the internal combustion engine 4. In a variant, the first decoupling mechanism 11 can be separate from the transmission 5. For example, the first decoupling mechanism 11 can be disposed between the drive shaft 8 and the transmission 5; or between the internal combustion engine 4 and the transmission 5.

The second decoupling mechanism 12 comprises a second input means in the form of a second input shaft; and a second output means in the form of a second output shaft. The drive shaft 8 transmits torque to the second input shaft; and the second output shaft transmits a torque to first and second rear half shafts 9, 10 to drive the driven wheels $W_D$. The second output shaft can, for example, transmit torque to a rear differential 13 configured to transmit torque to the first and second rear half shafts 9, 10. When the internal combustion engine 4 is decoupled from the drive shaft 8 (i.e. the first decoupling mechanism 11 is open), the first and second rear half shafts 9, 10 transmit torque to the second output shaft of the second decoupling mechanism 12. The second decoupling mechanism 12 is operable to decouple the drive shaft 8 from the driven wheels $W_D$. The second decoupling mechanism 12 is closed to couple the second input shaft to the second output shaft, thereby coupling the drive shaft 8 to the driven wheels $W_D$. Conversely, the second decoupling mechanism 12 is opened to decouple the second input shaft from the second output shaft, thereby decoupling the drive shaft 8 from the driven wheels $W_D$. In the present embodiment the second decoupling mechanism 12 comprises a multi-plate clutch. The multi-plate clutch allows slip between the second input shaft and the second output shaft to compensate for the different rotational speeds of the drive shaft 8 and the first and second rear half shafts 9, 10 when the driveline disconnect gliding mode is deactivated. In a modified arrangement, the second decoupling mechanism 12 can comprise first and second clutch mechanisms associated with the first and second rear half shafts 9, 10 respectively. The first and second clutch mechanisms can, for example, be incorporated into the rear differential 13.

The controller 2 comprises at least one electronic processor P configured to execute a set of computational instructions stored on a non-transitory computer readable media. The controller 2 monitors one or more vehicle dynamic conditions, such as vehicle acceleration and/or speed; and one or more vehicle operating parameters, such as output torque from the internal combustion engine 4. The controller 2 is configured to identify a vehicle glide opportunity when the measured dynamic condition(s) differs from a desired vehicle dynamic condition for the current vehicle operating parameter(s). The controller 2 can also check to identify a positive torque request indicative of a driver intention to maintain the current vehicle dynamic conditions. When these conditions are satisfied, the controller 2 publishes an activation signal $S_{ACT}$ to a vehicle communications network COM to activate a driveline disconnect gliding mode. In dependence on the activation signal $S_{ACT}$, the first decoupling mechanism 11 is opened to decouple the drive shaft 8 from the internal combustion engine 4; and the second decoupling mechanism 12 is opened to decouple the drive shaft 8 from the first and second rear half shafts 9, 10. A powertrain control module (PCM) also operates to reduce the torque request of the internal combustion engine 4. The internal combustion engine 4 can operate at idle during the driveline disconnect gliding mode or can be shut down by inhibiting the combustion cycle. By opening both the first and second decoupling mechanisms 11, 12, the rotational speed of the drive shaft 8 decreases and, depending on the duration of the driveline disconnect gliding mode, can come to rest. As the driveline 6 is not coupled to the driven wheels $W_D$ when the second decoupling mechanism 12 is open, the total losses acting on the vehicle 1 can be reduced. At least in certain embodiments, this enables activation of the driveline disconnect gliding mode over a broader range of operating conditions.

With reference to FIG. 4, the at least one processor P is configured to receive a wheel speed signal $S_{WH}$, an internal combustion engine speed signal $S_{ICE}$ and a torque request signal $S_{TQ}$. The wheel speed signal $S_{WH}$ is generated by at least one wheel speed sensor 14 associated with the driven wheels $W_D$ of the vehicle 1. The internal combustion engine speed signal $S_{ICE}$ is generated by a crankshaft speed sensor 15. The torque request signal $S_{TQ}$ is generated in dependence on a pedal position sensor 16 associated with a throttle pedal 17. The torque request signal $S_{TQ}$ comprises a torque demand signal generated by a driver of the vehicle 1 when the throttle pedal 17 is depressed. Alternatively, or in addition, the torque demand signal can be generated by a cruise control system, for example to match a target vehicle speed.

The transmission control module (TCM) 7 detects the activation signal $S_{ACT}$ published to the communications network COM. In dependence on said activation signal $S_{ACT}$, the transmission control module 7 controls operation of the internal clutches in the transmission 5 to decouple the drive shaft 8 from the transmission 5. The second decoupling mechanism 12 is also opened to disconnect the drive shaft 8 from the first and second rear half shafts 9, 10. The drive shaft 8 is thereby disconnected from the internal combustion engine 4 and from the driven wheels $W_D$. The first and second decoupling mechanisms 11, 12 can be opened concurrently or sequentially to activate the driveline disconnect gliding mode. The internal combustion engine 4 is shut down by inhibiting the combustion cycle. As shown in FIG. 5, when the first and second decoupling mechanisms 11, 12 are open, the drive shaft 8 comes to rest. The operating speed of the internal combustion engine 4 can be reduced, for example to an idle speed. It will be appreciated that the first and second rear half shafts 9, 10 continue to rotate since the rotation of the driven wheels $W_D$ transmits an input torque.

Figure 6:
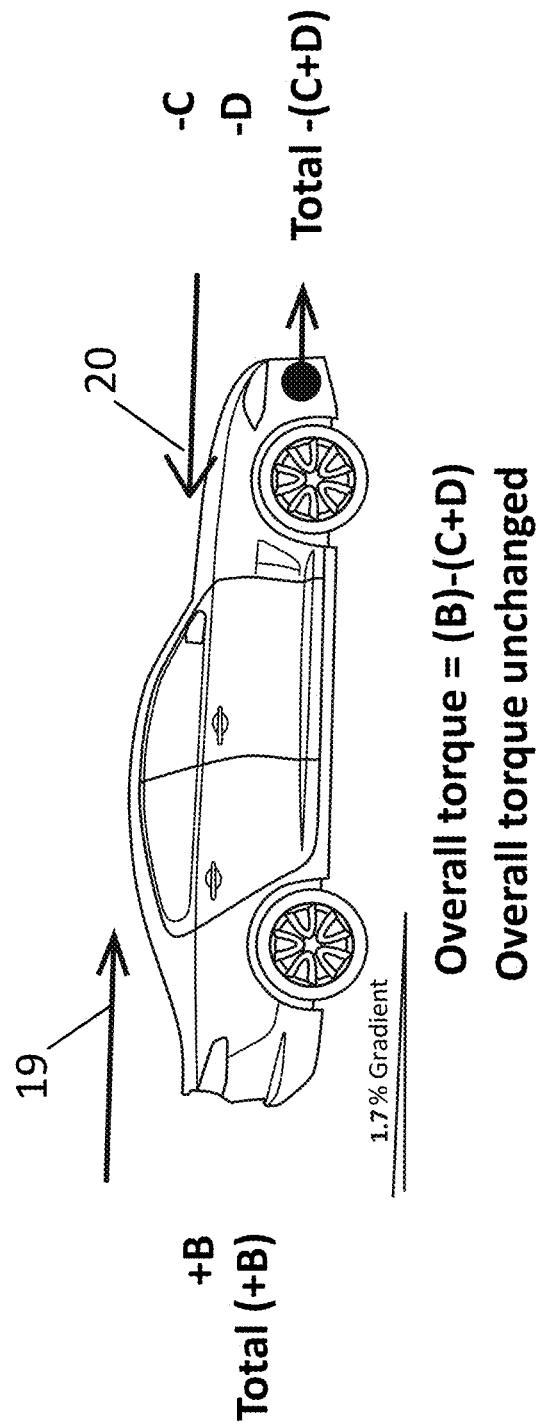
FIG. 6 shows a schematic representation of the loads on the vehicle shown in FIG. 4 when operating in the said driveline disconnect gliding mode.

The operating loads acting on the vehicle 1 when the driveline disconnect gliding mode has been activated are shown schematically in FIG. 6. The first arrow 19 (pointing from left to right) represents the positive forces acting on the vehicle 1. The same deceleration rate is achievable by activating the driveline disconnect gliding mode in accordance with an aspect of the present invention. The effective torque B is delivered by virtue of the negative gradient on which the vehicle 1 is travelling. The positive contribution of the engine torque A is removed since the transmission 5 selects neutral and the internal combustion engine 4 is slowed to idle speed or is stopped. The second arrow 20 (pointing from right to left) represents the negative (i.e. decelerating) forces. The negative contributions of the engine loss torque E and the transmission loss torque F are removed. The driveline loss torque G is at least partially removed since the drive shaft 8 is decoupled from the internal combustion engine 4 and the driven wheel W. The total positive torque is provided by the effective torque B, and the total negative torque comprises the aerodynamic torque C and the road loss torque D, i.e. −(C+D). A second difference between the positive torque and the negative torque is calculated as follows: (B)−(C+D). By removing the driveline loss torque G, the range of operating conditions in which the driveline disconnect gliding mode can usefully be activated is increased, for example to allow activation at smaller gradients.

The controller 2 monitors the vehicle dynamic conditions and the vehicle operating parameters to determine when the driveline disconnect gliding mode is no longer appropriate (i.e. when the effective torque B is no longer sufficient to compensate for the aerodynamic torque C and the road loss torque D. The controller 2 then deactivates the driveline disconnect gliding mode. The controller 2 implements a first control strategy to couple the drive shaft 8 to the driven wheels $W_D$ and to the internal combustion engine 4. Specifically, the controller 2 closes the second decoupling mechanism 12 to couple the drive shaft 8 to the driven wheels $W_D$ by the first and second rear half shafts 9, 10. The drive shaft 8 is decoupled during the driveline disconnect gliding mode and has a lower rotational speed than the driven wheels $W_D$. Indeed, the rotational speed of the drive shaft 8 may be zero (0) during the driveline disconnect gliding mode. The multi-plate clutch arrangement of the second decoupling mechanism 12 allows slip between the second input shaft and the second output shaft. The second decoupling mechanism 12 closes and the rotational speed of the drive shaft 8 increases in proportion to the rotational speed of the first and second rear half shafts 9, 10 which are drivingly connected to the driven wheels $W_D$. The controller 2 initiates an engine start-up procedure, for example by activating a starter motor (not shown), to re-start the internal combustion engine 4. The engine start-up procedure can be performed concurrently with closing of the second decoupling mechanism 12. After the second decoupling mechanism 12 is closed, the controller 2 determines the rotational speed of the drive shaft 8. The rotational speed of the drive shaft 8 could be measured directly, for example using a dedicated speed sensor. However, in the present embodiment the rotational speed of the drive shaft 8 is determined in dependence on the measured wheel speed (as indicated by the wheel speed signal SWH) which is proportional to the rotational speed of the drive shaft 8. The controller 2 then determines a target operating speed for the internal combustion engine 4 at least substantially to match the rotational speed across the first decoupling mechanism 11. The controller 2 outputs an engine speed request signal in dependence on the determined target operating speed. Once the operating speed of the internal combustion engine 4 at least substantially matches the target operating speed, the controller 2 outputs a control signal to close the first decoupling mechanism 11. The driveline 6 is thereby re-coupled to the internal combustion engine 4 and to the driven wheels $W_D$.

The control strategy described above to terminate the driveline disconnect gliding mode requires that the second decoupling mechanism 12 allows slip between the second input shaft and the second output shaft to accommodate the different rotational speeds of the drive shaft 8 and the first and second rear half shafts 9, 10 when the driveline disconnect gliding mode is deactivated. In the present embodiment, the second decoupling mechanism 12 comprises a multi-plate clutch to allow slip. A first variant which does not require the second decoupling mechanism 12 to provide slip will now be described. In the first variant, the second decoupling mechanism 12 can, for example, comprise a dog clutch disposed in series with an output of a differential; or a dog clutch disposed between a ring gear and a differential carrier. The controller 2 is configured to activate the driveline disconnect gliding mode by opening the first and second decoupling mechanisms 11, 12 to decouple the drive shaft 8. The first and second decoupling mechanisms 11, 12 may be opened simultaneously to decouple the drive shaft 8 or sequentially. Alternative control strategies implemented for the first variant to deactivate the driveline disconnect gliding mode will now be described. In a further variant, if the internal combustion engine 3 is stopped and comes to rest during the driveline disconnect gliding mode, the first decoupling mechanism 11 can be closed concurrent with or before the internal combustion engine 3 is re-started. This control strategy would allow the drive shaft 8 to be coupled to the internal combustion engine 3 when the rotational speeds are similar, potentially both zero.

A second control strategy for deactivating the driveline disconnect gliding mode will now be described. The controller 2 determines a target operating speed for the internal combustion engine 4 in dependence on the measured wheel speed of the driven wheels $W_D$. In particular, the target operating speed is determined such that the input rotational speed of the first decoupling mechanism 11 is substantially the same as the input rotational speed of the second decoupling mechanism 12 (which is proportional to the wheel speed of the driven wheels $W_D$). When the operating speed of the internal combustion engine 4 matches the target operating speed, the first decoupling mechanism 11 is closed. The first decoupling mechanism 11 accommodates slip, thereby allowing the rotational speed of the drive shaft 8 to increase progressively to match the input rotational speed of the first decoupling mechanism 11. By controlling the operating speed of the internal combustion engine 4, the rotational speed of the drive shaft 8 can be at least substantially matched to the output rotational speed of the second decoupling mechanism 12. Once the rotational speed have been matched, the second decoupling mechanism 12 is closed to re-couple the drive shaft 8 to the driven wheels $W_D$ via the first and second rear half shafts 9, 10. By controlling the operating speed of the internal combustion engine 4 to synchronise the rotational speed of the drive shaft 8 to the output rotational speed of the second decoupling mechanism 12, a non-slip coupling mechanism can be utilised.

A third control strategy for deactivating the driveline disconnect gliding mode will now be described. The internal combustion engine 4 is re-started. The first decoupling mechanism 11 is closed to couple the drive shaft 8 to the internal combustion engine 4. The first decoupling mechanism 11 accommodates slip, thereby allowing the rotational speed of the drive shaft 8 to increase progressively to match the input rotational speed of the first decoupling mechanism 11. The controller 2 then determines a target operating speed for the internal combustion engine 4 in dependence on the measured wheel speed of the driven wheels $W_D$. The target operating speed is determined such that the input rotational speed of the first decoupling mechanism 11 is substantially the same as the input rotational speed of the second decoupling mechanism 12 (which is proportional to the wheel speed of the driven wheels $W_D$). When the operating speed of the internal combustion engine 4 matches the target operating speed, the second decoupling mechanism 12 is closed to re-couple the drive shaft 8 to the driven wheels $W_D$ via the first and second rear half shafts 9, 10. By controlling the operating speed of the internal combustion engine 4, the rotational speed of the drive shaft 8 can be at least substantially matched to the input rotational speed of the second decoupling mechanism 12. It will be understood that controlling the operating speed of the internal combustion engine 4 to synchronise the rotational speed of the drive shaft 8 to the input rotational speed of the second decoupling mechanism 12 allows use of a non-slip coupling mechanism.

The second and third control strategies are both applicable to the variant of the second decoupling mechanism 12 described above which does not permit slip between the second input shaft and the second output shaft. It will be appreciated, however, that the second control strategy could also be applied to arrangements in which the second decoupling mechanism 12 does permit slip.

The vehicle 1 in the above embodiment has a rear-wheel drive arrangement. The invention described herein is equally applicable to a vehicle 1 having a front-wheel drive arrangement. A further embodiment of the present invention implemented in a vehicle 1 having a front-wheel drive arrangement will now be described with reference to FIGS. 7 and 8. Like reference numerals will be used for like components in the description of this arrangement.

Figure 7:
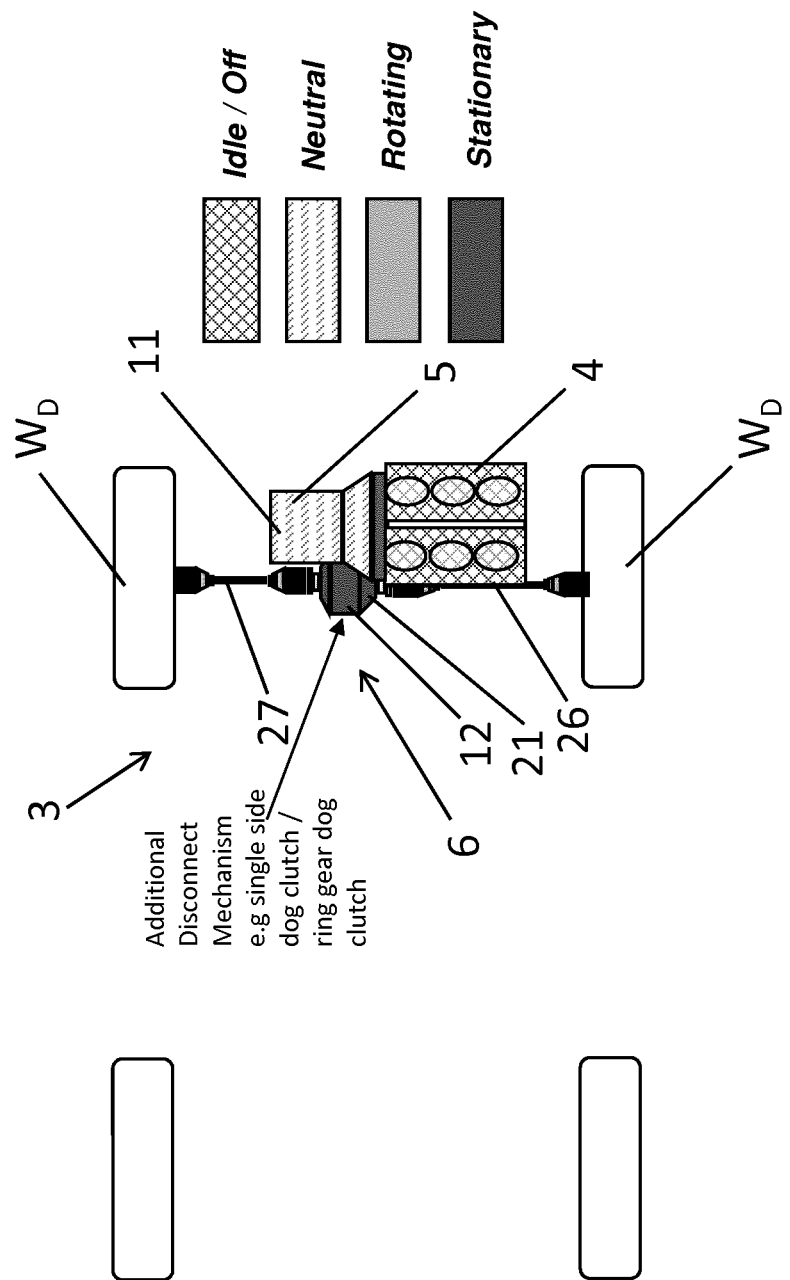
FIG. 7 shows a schematic representation of a front-wheel drive vehicle operating in a driveline disconnect gliding mode in accordance with an embodiment of the present invention.

As shown in FIG. 7, the vehicle 1 comprises a powertrain 3 for generating a traction force to propel the vehicle 1. The powertrain 3 comprises an internal combustion engine 4, a transmission 5 and a driveline 6. The internal combustion engine 4 is arranged in a transverse configuration (East West) in the vehicle 1. The transmission 5 is an automated transmission comprising one or more internal friction brake; and one or more multi-plate clutch. The driveline 6 is arranged to transmit torque from the internal combustion engine 4 to driven wheels $W_D$. In the present embodiment, the driveline 6 is configured to transmit torque to the front wheels of the vehicle 1.

Figure 8:
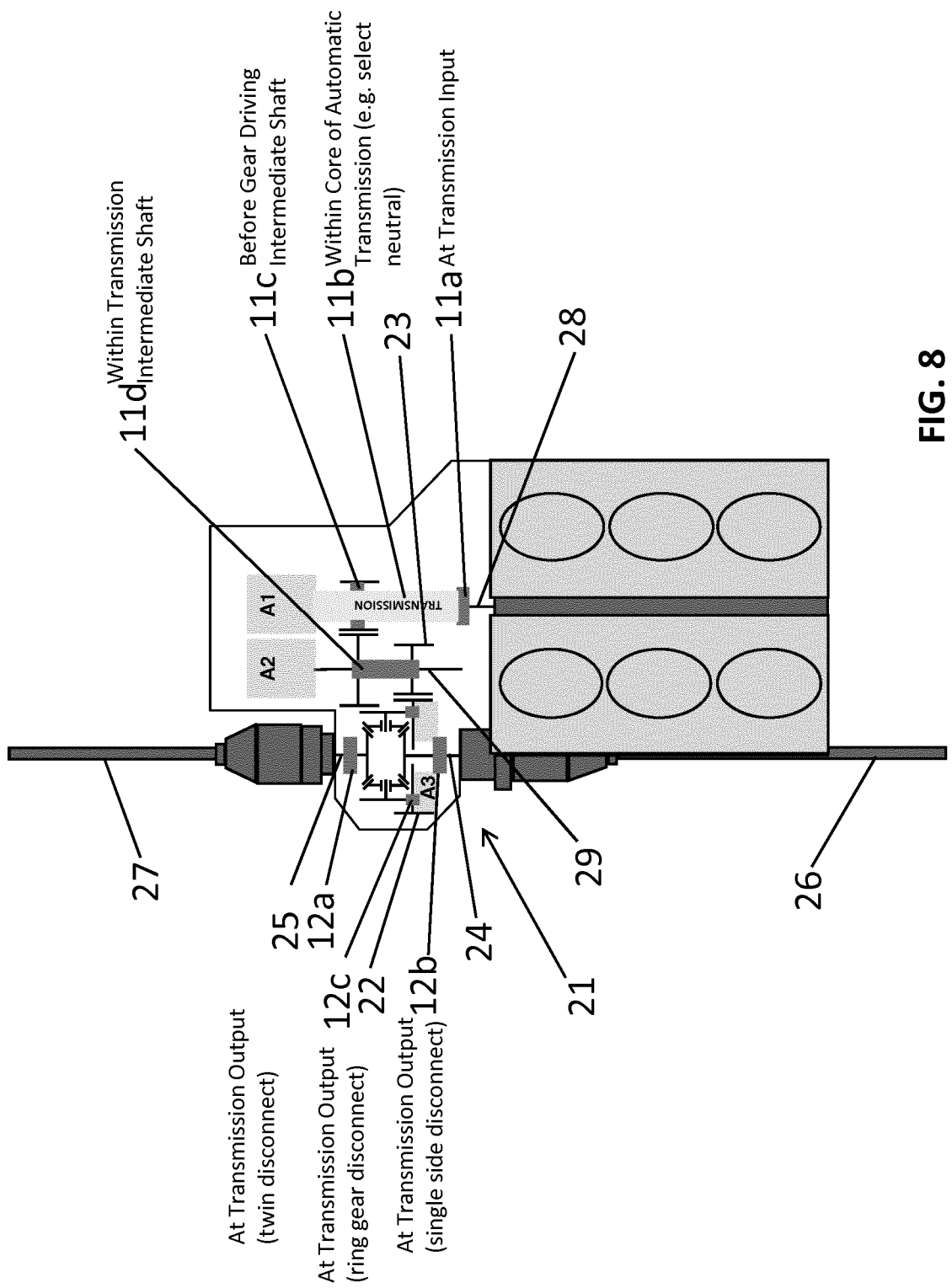
FIG. 8 shows a schematic representation of the transmission and front differential of the front-wheel drive vehicle shown in FIG. 7.

The driveline 6 comprises a torque transmitting means for transmitting torque from the internal combustion engine 4 to the driven wheels $W_D$. With reference to FIG. 8, the torque transmitting means comprises a front differential 21 drivingly connected to the transmission 5. In particular, the front differential 21 comprises an input ring gear 22 which meshes with an output gear 23 of the transmission 5. The front differential 21 comprises first and second output shafts 24, 25 coupled to respective first and second front half shafts 26, 27. In use, the first and second front half shafts 26, 27 transmit torque to the driven wheels $W_D$ of the vehicle 1.

In accordance with the other embodiments described herein, the vehicle 1 comprises a first decoupling mechanism 11 and a second decoupling mechanism 12. The first and second decoupling mechanisms 11, 12, can be selectively opened to decouple the front differential 21 from the driveline 6 when the vehicle 1 is operating in a driveline disconnect gliding mode. The first and second decoupling mechanisms 11, 12 can be controlled independently of each other. For example, the first and second decoupling mechanisms 11, 12 can be opened simultaneously or sequentially. As described herein, the controller 2 is configured to control operation of the first and second decoupling mechanisms 11, 12.

The transmission 5 transmits an input torque to the input ring gear 22; and the differential transmits an output torque to the front half shafts 26, 27. The first decoupling mechanism 11 is operable selectively to couple and decouple the front differential 21 to the transmission 5.

The first decoupling mechanism 11 is incorporated into the transmission 5. The first decoupling mechanism 11 may be associated with a transmission input shaft 28 which is connected to the internal combustion engine 4. This arrangement of the first decoupling mechanism is denoted by the reference 11a in FIG. 8. Alternatively, the first decoupling mechanism 11 may be incorporated into the transmission 5, for example by selecting neutral or opening a transmission clutch, as denoted by the reference 11b in FIG. 8. In a further alternative, the first decoupling mechanism 11 may be incorporated into the transmission 5 before a gear driving an intermediate shaft 29 within the transmission 5, as denoted by the reference 11c in FIG. 8. Alternatively, the first decoupling mechanism 11 may be incorporated into the intermediate shaft of the transmission 5, as denoted by the reference 11d in FIG. 8. These variations on the first decoupling mechanism 11 may be incorporated into the other embodiments described herein.

The front differential 21 transmits torque to the first and second front half shafts 26, 27 to drive the driven wheels $W_D$. The second decoupling mechanism 12 is operable selectively to couple and decouple the first and second output shafts 24, 25 to the respective first and second front half shafts 26, 27. The second decoupling mechanism 12 in the present embodiment comprises first and second output decoupling mechanisms 12a, 12b which can be opened to decouple the first and second output shafts 24, 25 from the first and second front half shafts 26, 27. The second decoupling mechanism 12 is operable to decouple the transmission 5 and the front differential 21 from the driven wheels $W_D$. The second decoupling mechanism 12 in this embodiment is operable to disconnect both sides of the front differential 21. The first and second output decoupling mechanisms 12a, 12b may be operated together or independently of each other. The first and second output decoupling mechanisms 12a, 12b in the present embodiment are incorporated into the front differential 21. However, it will be appreciated that the first and second output decoupling mechanisms 12a, 12b may be separate from the front differential 21, for example disposed between the front differential 21 and the first and second front half shafts 26, 27.

The controller 2 in this further embodiment is configured to implement the first control strategy described herein. When the driveline disconnect gliding mode is activated, the first and second decoupling mechanisms 11, 12 are open such that the front differential 21 and the transmission 5 are decoupled from the driveline 6. In further variants, the second decoupling mechanism 12 can comprise one or more non-slip mechanisms. The controller 2 can be configured to implement the second and third control strategies described herein to deactivate the driveline disconnect gliding mode.

In certain modified arrangements, the second decoupling mechanism 12 may provide a single-side disconnect. The second decoupling mechanism 12 may comprise a single output decoupling mechanism (either the first output decoupling mechanism 12a or the second output decoupling mechanism 12b) which may be opened to decouple the front differential 21. In this arrangement, the front differential 21 may rotate when the output decoupling mechanism 12 is opened.

In a further modified arrangement, the second decoupling mechanism 12 may be associated with the input ring gear 22 of the front differential 21. This arrangement of second decoupling mechanism is denoted by the reference 12c in FIG. 8. The second decoupling mechanism 12c is opened to decouple the input ring gear 22. Conversely, the second decoupling mechanism 12c is closed to couple the input ring gear 22.

At least some of the features described herein with reference to the front differential 21 may be incorporated into the rear differential 13 described with reference to the rear-wheel drive embodiments of the present invention. For example, the second decoupling mechanism 12 described with reference to the front differential 21 may be incorporated into the rear differential 13 to enable the first and second rear half shafts 9, 10 to be selectively coupled and decoupled.

The vehicle 1 may comprise one or more electric traction motor. The vehicle 1 may, for example, be a Mild Hybrid Electric Vehicle (MHEV) or a Plug-in Hybrid Electric Vehicle (PHEV). The one or more electric traction motor may, for example, be incorporated into the transmission 5 or the driveline 6. The one or more electric traction motor could, for example, be coupled to the transmission input shaft 28, the transmission intermediate shaft or the transmission output shaft.

Figure 9:
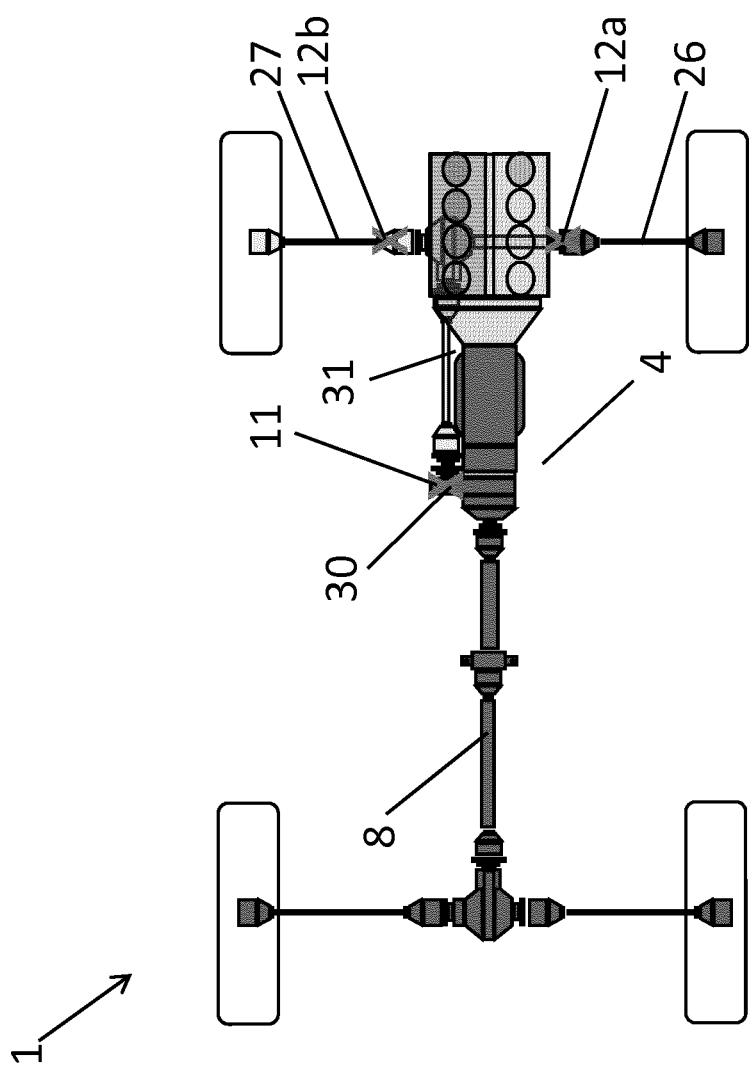
FIG. 9 shows a schematic representation of a four-wheel drive vehicle operable in a driveline disconnect gliding mode in accordance with an embodiment of the present invention.

Aspects of the invention described herein could also be implemented in a four-wheel drive vehicle having front and rear driven wheels $W_D$. A vehicle 1 having four-wheel drive and comprising first and second decoupling mechanisms 11, 12 in accordance with an embodiment of the present invention is shown in FIG. 9. The vehicle 1 comprises a transfer case 30 drivingly connected to the transmission 5. A front driveshaft 31 connects the transfer case 30 to the first and second front half shafts 26, 27. The first decoupling mechanism 11 is incorporated into the transfer case 30 and is operable to disconnect the front driveshaft 31 from the transfer case 30. The second decoupling mechanism 12 comprises first and second output decoupling mechanisms 12a, 12b associated with the first and second front half shafts 26, 27 respectively. When the vehicle 1 is operating in a driveline disconnect gliding mode, the first decoupling mechanism 11 is opened to disconnect the transfer case 30 from the front driveshaft 31; and the first and second output decoupling mechanisms 12a, 12b are opened to disconnect the first and second front half shafts 26, 27 from the front driveshaft 31. The front driveshaft 31 may thereby be disconnected from the internal combustion engine 3 and the front driven wheels $W_D$ when the driveline disconnect gliding mode is activated. It will be appreciated that additional decoupling mechanisms may be provided for disconnecting the driveshaft 8 from the rear driven wheels $W_D$. For example, the mechanisms described herein with reference to the rear-wheel drive vehicle 1 shown in FIG. 5 may be implemented in the four-wheel drive vehicle 1 shown in FIG. 9. The four-wheel drive function of the vehicle 1 may be permanently engaged. Alternatively, the four-wheel vehicle function of the vehicle 1 may be selectively four-wheel drive, for example operating in two-wheel drive under normal operating conditions. The activation of the driveline disconnect gliding mode may be controlled in dependence on whether the vehicle 1 is operating in four-wheel drive or two-wheel drive.

It will be appreciated that various changes and modifications can be made to embodiments described herein without departing from the scope of the present invention.

The invention claimed is:

1. A vehicle comprising:
a torque generating machine;
at least one driven wheel;
a driveline for transmitting torque from the torque generating machine to said at least one driven wheel, the driveline comprising a torque transmitting means;
a first decoupling mechanism operable to decouple the torque transmitting means from the torque generating machine, wherein the first decoupling mechanism is closed to couple the torque transmitting means to the torque generating machine and is opened to decouple the torque transmitting means from the torque generating machine;
a second decoupling mechanism operable to decouple the torque transmitting means from the at least one driven wheel, wherein the second decoupling mechanism is closed to couple the torque transmitting means to the at least one driven wheel and is opened to decouple the torque transmitting means from the at least one driven wheel; and
a controller comprising at least one electronic processor for controlling operation of the first and second decoupling mechanisms, wherein the at least one electronic processor is configured to:
close the first decoupling mechanism;
determine a target operating speed of the torque generating machine;
after closing the first decoupling mechanism, control the operating speed of the torque generating machine in dependence on the determined target operating speed; and
close the second decoupling mechanism when the operating speed of the torque generating machine at least substantially matches the determined target operating speed.

2. The vehicle as claimed in claim 1, wherein the first decoupling mechanism comprises first torque input means and first torque output means, wherein the first decoupling mechanism accommodates slip between the first torque input means and the first torque output means.

3. The vehicle as claimed in claim 1, wherein the at least one electronic processor is configured to determine the target operating speed of the torque generating machine in dependence on a wheel speed signal.

4. A vehicle as claimed in claim 1, wherein the second decoupling mechanism comprises second torque input means and second torque output means, wherein the second decoupling mechanism is a non-slip mechanism.

5. The vehicle as claimed in claim 4, wherein the second decoupling mechanism comprises one or more of the following set: a torque converter, a single-plate clutch, a multi-plate clutch, a synchronizer, a hydrostatic coupling and a magnetic coupling.

6. The vehicle as claimed in claim 1, comprising a transmission coupled to the torque generating machine, wherein the first decoupling mechanism is incorporated into the transmission.

7. The vehicle as claimed in claim 1, comprising a transmission coupled to the torque generating machine, wherein the first decoupling mechanism is disposed between the torque generating machine and the transmission or between the transmission and the torque transmitting means.

8. The vehicle as claimed in claim 1, wherein the first decoupling mechanism comprises one or more of the following set: a torque converter, a single-plate clutch, a multi-plate clutch, a synchronizer, a hydrostatic coupling and a magnetic coupling.

9. The vehicle as claimed in claim 1, wherein the torque generating machine comprises an internal combustion engine.

10. The vehicle as claimed in claim 1, wherein the controller is configured to activate a driveline disconnect gliding mode by opening the first decoupling mechanism to decouple the torque transmitting means from the torque generating machine and opening the second decoupling mechanism to decouple the torque transmitting means from the at least one driven wheel.

11. A method of controlling first and second decoupling mechanisms to control a transmittal of torque from a torque generating machine to at least one driven wheel of a vehicle; the method comprising:
opening the first decoupling mechanism to decouple torque transmitting means from the torque generating machine;
opening the second decoupling mechanism to decouple the torque transmitting means from the at least one driven wheel;
closing the first decoupling mechanism;
determining a target operating speed of the torque generating machine;
after closing the first decoupling mechanism, controlling the operating speed of the torque generating machine in dependence on the determined target operating speed; and
closing the second decoupling mechanism when the operating speed of the torque generating machine at least substantially matches the determined target operating speed.

12. The method as claimed in claim 11, comprising determining the target operating speed of the torque generating machine in dependence on a wheel speed signal.

13. The method as claimed in claim 11, wherein the second decoupling mechanism comprises second torque input means and second torque output means; the method comprising at least substantially matching a rotational speed of the second torque input means and the second torque output means and then closing the second decoupling mechanism.

14. The method as claimed in claim 11, comprising activating a driveline disconnect gliding mode by opening the first decoupling mechanism to decouple the torque transmitting means from the torque generating machine and opening the second decoupling mechanism to decouple the torque transmitting means from the at least one driven wheel.

15. A controller comprising at least one processor configured to implement the method of claim 11.

* * * * *